No. 762,802. PATENTED JUNE 14, 1904.
L. A. CASGRAIN.
CONTROLLING DEVICE.
APPLICATION FILED FEB. 20, 1899. RENEWED MAR. 4, 1904.
NO MODEL. 2 SHEETS—SHEET 1.
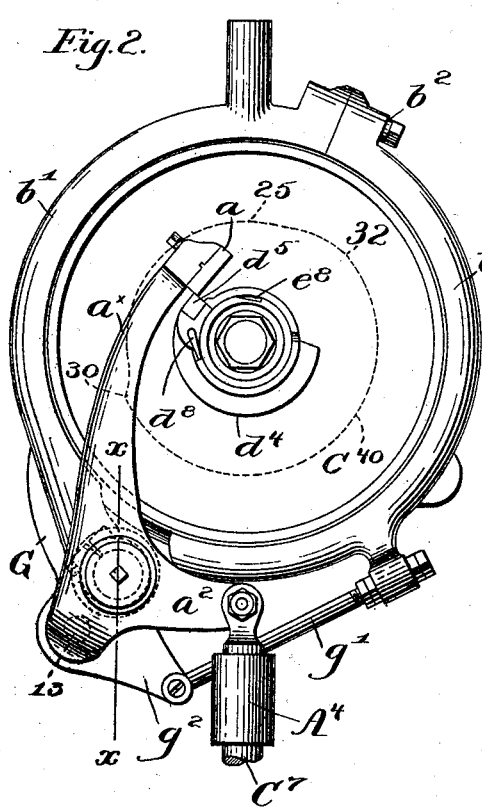
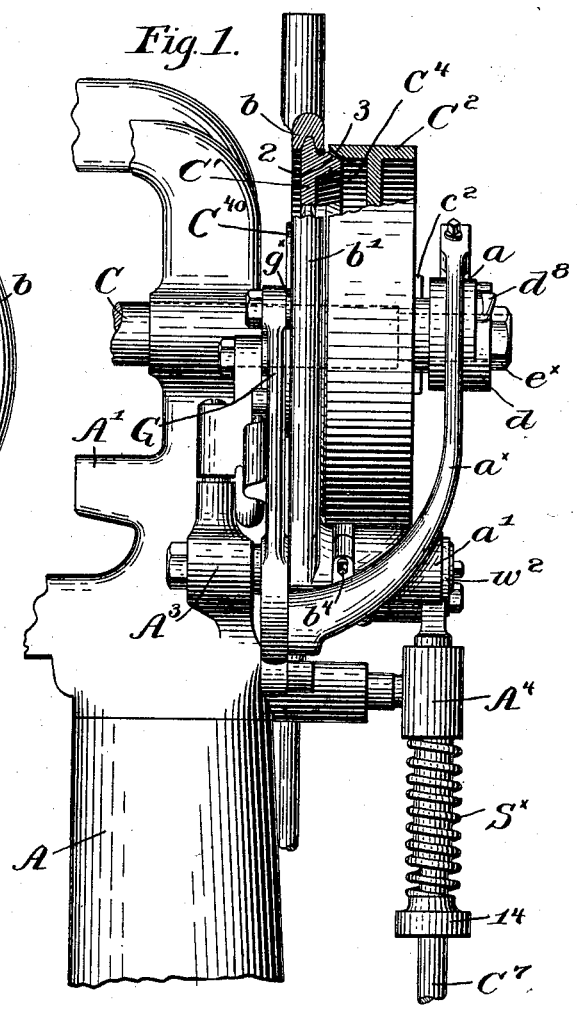
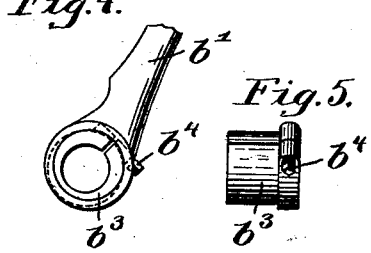
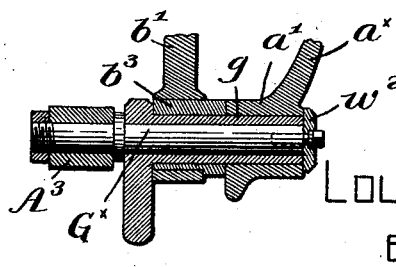
WITNESSES.
Charles F. Logan.
Fred S. Greenhof.
INVENTOR.
Louis A. Casgrain.
BY Crosby & Gregory.
ATT'YS.

No. 762,802. PATENTED JUNE 14, 1904.
L. A. CASGRAIN.
CONTROLLING DEVICE.
APPLICATION FILED FEB. 20, 1899. RENEWED MAR. 4, 1904.
NO MODEL. 2 SHEETS—SHEET 2.
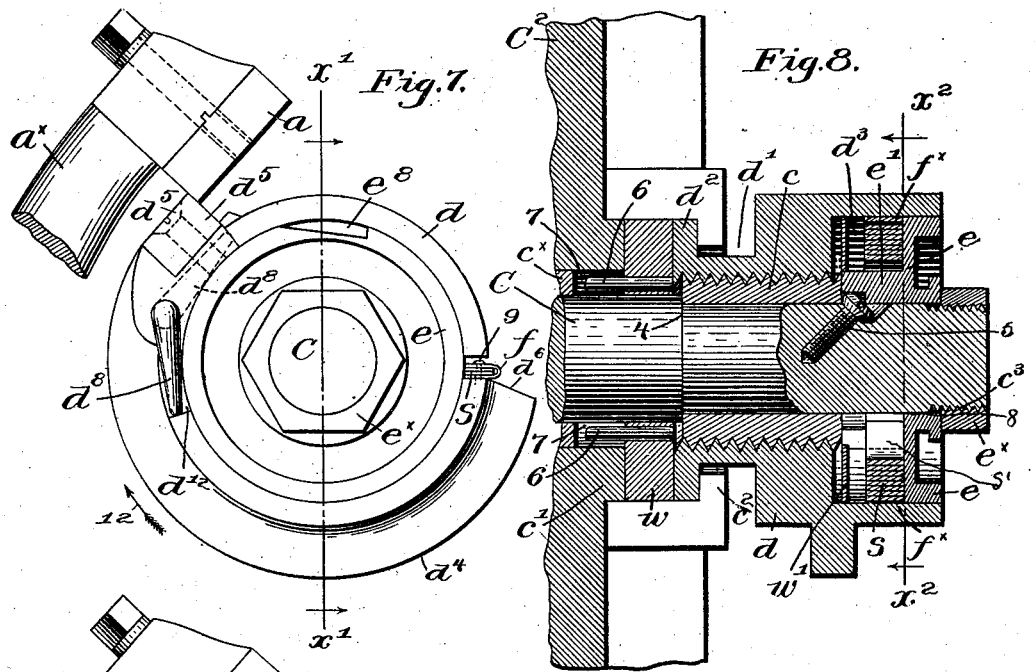
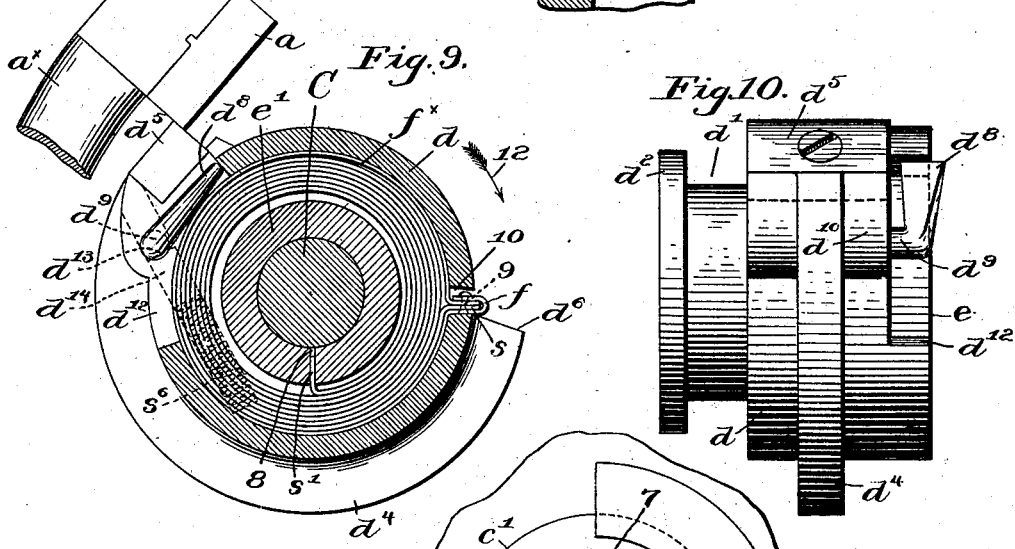
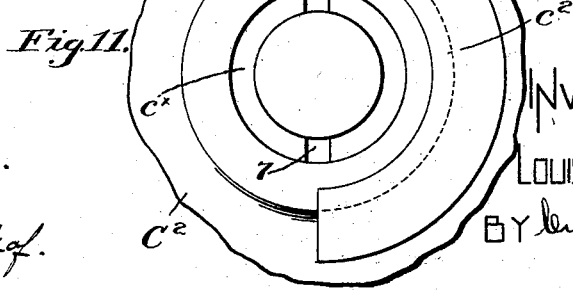
WITNESSES.
Charles F. Logan.
Fred S. Greenleaf.
INVENTOR.
Louis A. Casgrain
BY Crosby Gregory
ATT'YS.

No. 762,802.

Patented June 14, 1904.

UNITED STATES PATENT OFFICE.

LOUIS A. CASGRAIN, OF WINCHESTER, MASSACHUSETTS, ASSIGNOR, BY MESNE ASSIGNMENTS, TO THE UNITED SHOE MACHINERY COMPANY, A CORPORATION OF NEW JERSEY.

CONTROLLING DEVICE.

SPECIFICATION forming part of Letters Patent No. 762,802, dated June 14, 1904.

Original application filed October 24, 1898, Serial No. 694,381. Divided and this application filed February 20, 1899. Renewed March 4, 1904. Serial No. 196,496. (No model.)

*To all whom it may concern:*

Be it known that I, LOUIS A. CASGRAIN, of Winchester, county of Middlesex, State of Massachusetts, have invented an Improvement in Controlling Devices, of which the following description, in connection with the accompanying drawings, is a specification, like characters on the drawings representing like parts.

This invention has for its object the production of novel clutch mechanism and controlling devices therefor of highly efficient and durable construction and positive in action, the relative movement of the coöperating clutch members into or out of operative position being effected positively without the employment of a spring or springs interposed between or arranged to pull said members apart. The clutch-controlling devices are also of novel and effective construction, as will more fully appear hereinafter.

This application is a division of my application, Serial No. 694,381, filed October 24, 1898, wherein the clutch mechanism and controlling devices therefor, which form the subject-matter herein, are shown in operative connection with a machine for inserting metallic fastenings.

Figure 1 represents in side elevation and partially in section one embodiment of my invention in connection with a portion of the supporting-frame for, and a rotatable shaft actuated by or through, my novel clutch mechanism. Fig. 2 is a right-hand end elevation of the clutch-controller and brake mechanism shown in Fig. 1. Fig. 3 is a sectional detail of a portion of the brake mechanism on the line $x\ x$, Fig. 2. Figs. 4, 5, and 6 are detail views in elevation of some of the parts shown in Fig. 3. Fig. 7 is an enlarged view, in end elevation, of the clutch-controlling means illustrated in Fig. 2. Fig. 8 is a diametral sectional view thereof on the line $x'\ x'$, Fig. 7, looking toward the right. Fig. 9 is a transverse sectional view of the clutch-controlling means, taken on the line $x^2\ x^2$, Fig. 8, looking toward the left. Fig. 10 in side elevation represents the major portion of the clutch-controlling means; and Fig. 11 shows in end elevation the connection between the movable member of the clutch and the clutch-controlling means, the latter, as well as the shaft, being omitted.

Referring to Fig. 1, the mechanism is shown as mounted on the head $A'$ of an upright column or standard A, it being understood that the base of the column rests upon the floor or other support and sustains a suitable treadle (not shown) for controlling the operation of the mechanism, the shaft C, which is actuated by or through the clutch, being supported in suitable bearings on the head $A'$.

The shaft C has fast thereon a disk $C'$, having an annular flange $C^4$, beveled at 2 and forming one member of the friction-clutch, the coöperating movable member $C^2$ of the clutch being shown as a loose pulley having a beveled friction-surface 3 adjacent the beveled face 2 of the flange $C^4$.

The main shaft C is shouldered near its outer end, as at 4, Fig. 8, and an externally-threaded sleeve $c$ is slipped over the reduced portion of the shaft and held against the shoulder by a preferably inclined set-screw 5, and the outer relatively rotative member $d$ of the clutch-controller is threaded upon the sleeve $c$, the thread being quite coarse, as shown in Fig. 8.

The hub $c^×$ of the fast member $C'$ of the clutch is laterally extended to form a support for and upon which the movable clutch member $C^2$ rotates and is movable longitudinally, the said member $C^2$ having formed upon its hub $c'$ a substantially semicircular inturned flange $c^2$ to enter an annular groove $d'$ at the inner end of the controlling member $d$, so that movement of the latter longitudinally of the shaft C will effect like movement of the clutch member $C^2$.

A washer $w$ is interposed between the hub $c'$ and the flange $d^2$ of the controlling member $d$, pins 6 on the washer extending into sockets 7 in the hub $c^×$, said washer acting to prevent rotation of the said controlling member by or through the clutch member $C^2$, as would be the case if the end of the controlling member contacted with the hub of the clutch member.

The outer end of the member $d$ is shaped to form a socket $d^3$, which receives within it the coöperating member of the clutch-controller, shown as a disk $e$, having a hub $e'$, which bears against the adjacent end of the threaded sleeve $c$, a nut $e^x$ on the threaded portion $c^3$ of the shaft C serving to hold the hub and sleeve tightly against the shoulder 4, so that both will be fixed upon and rotate with the shaft.

A strong spring S is coiled around the hub $e'$ and has one end $s'$ inturned to enter a notch 8 in the hub, said spring being inclosed in an annular metal case $f^x$, (see Fig. 9,) the ends of which are outturned and secured together, as at $f$, the free end $s$ of the said spring being secured to the case by a rivet 9, which also holds the ends of the case together, Fig. 9. The radially-extended union thus formed projects into a slot 10 in the wall of the member $d$, it being noted that the latter is mounted on the threaded sleeve $c$, so that rotation of the member $d$ thereon will also effect its movement in the direction of the length of the shaft.

I prefer to mount a thin washer $w'$ on the hub $e'$ at its inner end to thus effectually inclose the actuating-spring S of the clutch-controlling means, the periphery of the disk $e$ fitting snugly in the socket or recess $d^3$ and preventing the entrance of dust or dirt.

By turning the sleeve $c$ slightly on the shaft before the set-screw 5 is tightened the proper engagement of the clutch member is readily effected, so that adjustment for wear or for other purposes is attained.

The parts of the clutch-controlling means are so adjusted that when the member $d$ is released the unwinding of the spring S will effect a rapid partial rotation thereof, about one-half of a revolution, relatively to the shaft C to thereby move said member $d$ to the left, viewing Fig. 8, by reason of its engagement with the right-hand threaded sleeve $c$, such movement effecting operative engagement of the fast and loose clutch members to rotate the member C.

When the apparatus is running and the member $d$ is stopped, as will be described, the momentum of the parts will operate to turn the shaft until the spring is wound up, and at the same time that the clutch is released by movement of said member $d$ to the right, Fig. 8, brake mechanism to be described is operated to stop the shaft C at a certain point.

The member $d$ is provided with an external segmental flange $d^4$, and at its leading end, rotation of the shaft C being in the direction of the arrow 12, Figs. 7 and 9, I prefer to secure a hardened-steel block $d^5$ to form a stop which at times coöperates with a detent $a$, preferably also made of hardened steel and attached to the upper end of an arm $a^x$ of a bell-crank lever, said detent when in position shown in Figs. 2, 7, and 9 engaging the stop $d^5$ and preventing rotation of the two members of the clutch-controller.

From the foregoing it will be obvious that the change in the relative angular positions of the two members $d$ and $e$ of the clutch-controller is made effective to throw the clutch into or out of operation, as the case may be, and the movable clutch member $C^2$ is positively moved into or out of engagement with the coöperating fast member $C'$ without the use of a spring or springs interposed between or to pull said members apart.

It is sometimes desirable to turn the mechanism connected with or driven by the shaft C by hand, and to do this without slipping the driving-belt from the pulley $C^2$, I have provided a locking device for the clutch-controller. (Shown best in Figs. 7, 9, and 10.) Such locking device consists, essentially, of a dog $d^8$ on the end of a locking-stud $d^9$, mounted parallel to the shaft C in a bearing $d^{10}$ of the member $d$, the latter having a peripheral recess $d^{12}$ therein to receive the dog when in operative position. (Shown in Fig. 10 and dotted lines, Fig. 7, or in inoperative position, Fig. 2, and in full lines, Fig. 7.)

The inner side of the stud $d^9$ is flattened at $d^{13}$, Fig. 9, to be acted upon by a plunger $d^{14}$, operated by a spring $s^6$, said plunger and spring moving in a suitable socket in the part $d$, the action of the spring normally tending to throw the dog $d^8$ in toward a recess $e^8$ in the periphery of the member $e$ of the clutch-controller, it being remembered that the recess $d^{12}$ exposes the periphery of said member $e$.

When it is desired to lock the members $d$ and $e$, the dog $d^8$ is turned into dotted-line position, Fig. 7, and the detent $a$ withdrawn, permitting the member $d$ to rotate until the dog $d^8$ snaps into the recess $e^8$, which action will take place before the clutch is thrown into operation.

The hub $a'$ of the arm $a^x$ has extended loosely through it the sleeve-like hub $g$ of a lever-arm G, (see Fig. 3,) mounted to rock on a fixed stud $G^x$, extended from a boss $A^3$ of the head A', as herein shown, the lever-arm G carrying a roll or other stud $g^x$, which travels on an edge cam $C^{40}$, (see dotted lines, Fig. 2,) secured to or forming part of the member $C'$ of the clutch, a washer $w^2$ retaining the hubs $a'$ and $g$ on the stud $G^x$.

The cam $C^{40}$ has a low portion gradually curving in from about the point 25 to point 30, at which there is a quick rise to the circular portion of the cam, said circular portion continuing to the point 32, between which and the point 25 the low part of the cam will permit the lever-arm G to swing inward sufficiently to release the clutch, the brake being set gradually after the roll $g^x$ passes the point 25.

The arms $a^x$ and G are connected by a pin or stud 13, Fig. 2, to rock in unison, so that the cam $C^{40}$ may govern the movement of the detent $a$, and thereby the action of the clutch-controller and clutch.

As shown in Fig. 1, the periphery of the clutch member C' is beveled or substantially Λ-shaped to be engaged by an interiorly-grooved two-part brake-shoe $b\ b'$, connected by a suitable bolt $b^2$, a link $g'$ adjustably connecting the part $b$ with the extension or arm $g^2$ of the lever G, while the free end of the part $b'$ of the shoe embraces an eccentric sleeve $b^3$, (shown separately in Figs. 5 and 6,) longitudinally split and clamped by a suitable bolt $b^4$ on the hub $g$ of the lever-arm G.

When the clutch is inoperative, the parts being in the position shown in Fig. 2, the separated ends of the brake-shoe will be drawn together to tightly clamp the periphery of the fast member C', the roll $g^x$ then resting on the lowest part of the cam $C^{40}$.

A bearing $A^4$ on the head A' receives therein a vertically-movable rod or link $C^7$, connected at its upper end to the arm $a^2$ of the lever-arm $a^x$, a strong spring $S^x$ surrounding the rod or link $C^7$ between a collar 14 fast thereon and the bearing $A^4$ to normally depress the link and apply the brake, the rod or link $C^7$ being controlled in any suitable manner—as, for instance, by a foot-treadle, not herein shown—which would operate to lift the rod when it is desired to start the apparatus. When this starting-rod is lifted, the arm $a^x$ is rocked to the left, Fig. 2, withdrawing the detent $a$ from the end of the segmental stop $d^4$, thereby permitting the clutch-controller to throw the clutch into operation, as hereinbefore described, and at the same time the lever-arm G is rocked, so that through the link $g'$ the part $b$ of the brake-shoe will be moved out from the periphery of the clutch member C', the eccentric sleeve $b^3$ at the same time operating to throw out the other part, $b'$, of the shoe. It will be obvious that the brake mechanism is thus released as the clutch becomes operative, and vice versa, the main portion of the cam $C^{40}$ holding the brake inoperative as the roll $g^x$ travels thereover.

When the machine is started—that is to say, when the clutch is rendered operative by or through the elevation of the rod $C^7$, as herein shown—the lever-arm G will be swung to the left, Fig. 2, and so long as the said arm is held in such position the clutch will remain operative and the shaft C will be rotated; but if the said rod $C^7$ is elevated and then released after the machine has been started the clutch will be automatically released when the roll $g^x$ leaves the high part of cam $C^{40}$ and engages the low part 32 25, after which the brake is applied when the roll reaches the part 25 30.

In order to prevent the application of the brake when the rod $C^7$ is thus elevated and then immediately released, the flange $d^4$ is made segmental, forming a continuation of the block $d^5$, so that the detent $a$ cannot move into operative position to stop the shaft until the rear or trailing end $d^6$ of the segmental flange passes beyond it.

The construction and arrangement of the parts as herein shown and described is very simple, strong, and durable and the operation thereof positive and rapid, and by reason of its rapid and positive action the clutch mechanism herein shown is particularly adapted for use in connection with machines wherein certain work is performed at every rotation of the main or driving shaft or where the rotation of the shaft is continued for different numbers of turns, according to the will of the operator.

My invention is not restricted to the precise construction and arrangement of parts herein shown, as I have illustrated my invention in one practical embodiment thereof without attempting to include the various forms or embodiments which might be shown.

Having described my invention, what I claim, and desire to secure by Letters Patent, is—

1. In an apparatus of the class described, a shaft, a screw-threaded part thereon, a clutch on the shaft comprising coöperating clutch members, a controlling device for the clutch engaging the screw-threaded part on the shaft, a detent normally to engage the controlling device to maintain the clutch members out of engagement, and means automatically operating upon the withdrawal of said detent to move the controlling device, through its engagement with the screw-threaded part on the shaft, to effect the engagement of the clutch members.

2. A rotary shaft, a clutch therefor, comprising a member rigidly secured to the shaft and a member carried loosely upon the shaft, a controlling member for the clutch connected to the loose member to move longitudinally therewith and mounted to have a limited rotative movement relative to the shaft, and being moved also longitudinally upon the shaft by such rotative movement, in combination with means to operate the clutch through the controlling member.

3. A shaft provided with a fast clutch member, a screw-thread part on the shaft, a loose clutch member, a clutch-controlling member mounted on said screw-threaded part, means for moving said controlling member on said screw-threaded part, and a connection between said controlling member and the loose clutch member, whereby said loose clutch member is moved positively toward and from the fast clutch member by said controlling member.

4. In an apparatus of the class described, a rotatable shaft, driving and driven clutch members therefor, a brake coöperating with the driven member, a clutch-controller, including two members one of which is rotative relatively to the other, and a segmental stop rotatable with the shaft and connected with the rotative member of the clutch-controller, combined with a detent to coöperate with said stop and connected with the brake, the periphery of the stop preventing premature operation of the detent, whereby the brake cannot be applied during a portion of each rotation of the shaft.

5. In an apparatus of the class described, a main driving-shaft, a clutch therefor, clutch-controlling means comprising two coöperating members having a limited relative angular movement, a threaded bearing fast on the shaft for that member operatively connected with the clutch, the other member being fast on the shaft, a spring connected at its ends with said two members, to effect rotative movement of the clutch-operating member and thereby move it longitudinally on its threaded bearing, and a detent for said clutch-controlling means, the members thereof having relative rotation imparted thereto by the spring upon withdrawal of the detent.

6. In an apparatus of the class described, a main driving-shaft, a clutch therefor, clutch-controlling means comprising two coöperating members having a limited relative angular movement, one member having an interiorly-threaded hub and a recessed end, and operatively connected with the clutch, the other member being fast on the shaft within the recessed end of its fellow, a spring coiled on the hub of the fast member and connected thereto and at its free end to the rotative member, a threaded bearing fast on said shaft for and upon which the said rotative member is also longitudinally movable, and a detent for the controlling means and to govern the action of the spring.

7. In an apparatus of the class described, a shouldered driving-shaft, a clutch therefor, an externally-threaded sleeve fast on the shaft and abutting against the shoulder thereof, and clutch-controlling means, comprising a recessed, internally-threaded member mounted on said sleeve to move longitudinally when rotated, relatively to said sleeve and connected with the loose member of the clutch, a flanged member fitted into the recess of the rotative member and fast on the shaft, an inclosed coiled spring connected with and to effect relative angular movement of said members, and a detent for the rotative member of the clutch-controlling means.

8. In an apparatus of the class described, a main driving-shaft, a clutch therefor, clutch-controlling means comprising two coöperating and concentric annular members having a limited relative angular movement, one member having rotative and longitudinal movement on said shaft to operate the clutch, a spring to effect such movement, a segmental stop on said rotative member, and a detent to coöperate therewith, the peripheral portion of the stop preventing return of the detent to operative position until the main shaft has completed a predetermined rotative movement.

9. In an apparatus of the class described, a main driving-shaft, a clutch therefor, and clutch-controlling means comprising a rotative member having a recessed outer end and connected with the movable member of the clutch, a threaded connection between said controlling member and the shaft, a coöperating member fast on the shaft and having a flange fitting snugly the recess of the other member, a spring attached at its ends to said members and coiled about the hub of the fast member inside the flange thereof, and a stop on the rotative member of said controlling means, combined with a detent to coöperate with the stop and govern the action of the controlling means.

10. In an apparatus of the class described, a main driving-shaft, a clutch therefor, clutch-controlling means comprising two coöperating members having a limited relative angular movement, one member having rotative and longitudinal movement on said shaft to operate the clutch, a spring to effect such movement, and an annular metallic case for and within which the spring is coiled, said case being attached to the free end of the spring and positively connected with the rotative controlling member to at all times partake of its rotative movement, combined with a detent to prevent relative movement of the controlling members.

11. In an apparatus of the class described, a driving-shaft, a clutch therefor, and clutch-controlling means comprising two coöperating members having a limited relative angular movement, one of said members rotatable on the shaft, being moved longitudinally by such relative movement and operatively connected with the clutch, a second member fast on the shaft, a spring to effect relative angular movement in one direction, means to effect such movement in the opposite direction against the stress of the spring, and a normally inoperative locking device carried by the rotative member, to engage the coöperating member and prevent angular movement of said members.

12. In an apparatus of the class described, a driving-shaft, a clutch therefor, and clutch-controlling means comprising two coöperating members having a limited relative angular movement, one of said members, rotatable on the shaft, being moved longitudinally by such relative movement and operatively connected with the clutch, said member having a recessed and peripherally-slotted portion, a second member fast on the shaft within the recessed portion of the rotative member and provided with a peripheral depression, a controlling-spring for said members, a locking-dog carried by and in the slot of the rotative member and adapted when in operative position to enter the depression of the other member, to prevent relative angular movement of said controlling members.

13. In an apparatus of the class described, a shaft, coöperating fast and loose clutch members mounted thereupon, a clutch-controlling member, and a washer interposed between said member and the end of the hub of the loose clutch member, said washer being connected loosely with the fast member, combined with means to partially rotate the clutch-controlling member and cause it to act on said washer, to thereby force the latter against the hub of and move the loose clutch member into operative engagement with the fast member.

In testimony whereof I have signed my name to this specification in the presence of two subscribing witnesses.

LOUIS A. CASGRAIN.

Witnesses:
JOHN C. EDWARDS,
AUGUSTA E. DEAN.